United States Patent [19]

Ligocki et al.

[11] Patent Number: 4,888,583

[45] Date of Patent: Dec. 19, 1989

[54] METHOD AND APPARATUS FOR RENDERING AN IMAGE FROM DATA ARRANGED IN A CONSTRUCTIVE SOLID GEOMETRY FORMAT

[76] Inventors: Terry J. Ligocki, 1052 E. Woodbury, Pasadena, Calif. 91104; Peter A. Borgwardt, 8297 SW. Canyon La., Portland, Oreg. 97225

[21] Appl. No.: 167,923

[22] Filed: Mar. 14, 1988

[51] Int. Cl.⁴ .............................................. G09G 1/00
[52] U.S. Cl. ................................... 340/729; 340/723; 364/522; 364/521
[58] Field of Search ....................... 340/729, 723, 747; 364/522, 521

[56] References Cited

U.S. PATENT DOCUMENTS 4,649,498  3/1987  Kedem et al. ........................ 364/518
4,785,399 11/1988  Evans et al. ........................ 364/300

OTHER PUBLICATIONS

Article Entitled "The Derivation of Graphics from Volume Models by Recursive Subdivision of the Object Space", by J. R. Woodwork and K. M. Quinlan, Proceedings of the Computer Graphics 80 Conference, Brighton, England.

Primary Examiner—Gerald Brigance
Assistant Examiner—Jeffery A. Brier
Attorney, Agent, or Firm—Mark M. Meininger; Robert S. Hulse

[57] ABSTRACT

A method and an apparatus render on a display screen (14) an image of a three-dimensional object. The object is represented by image data arranged in a constructive solid geometry format including at least one halfspace that divides an object space (28) into an interior region that lies inside the halfspace and an exterior region that lies outside the halfspace. The boundary of the halfspace is defined by an implicit mathematical function. The method includes subdividing the object space into volume elements of either a cubical or rectangular parallelepiped shape. For each volume element, an upper bound and a lower bound are calculated to the values of each function defining the boundary of a halfspace. In a first preferred embodiment, the calculation of the upper and lower bounds of the function defining a halfspace within a volume element identifies all of the extrema of the function that lie in or on the boundary of the volume element. In a second preferred embodiment, the upper and lower bounds are calculated as approximations to the absolute maximum and minimum values, respectively, of the function. An image is rendered in accordance with whether the upper and lower bounds of the function defining the boundary of a halfspace show that all locations in a volume element are inside or outside the halfspace.

16 Claims, 7 Drawing Sheets

METHOD AND APPARATUS FOR RENDERING AN IMAGE FROM DATA ARRANGED IN A CONSTRUCTIVE SOLID GEOMETRY FORMAT

TECHNICAL FIELD

The present invention relates to three-dimensional graphics display systems and, in particular, to such a system that renders on a display screen an image defined by image data arranged in a constructive solid geometry format.

BACKGROUND OF THE INVENTION

A three-dimensional graphics display system is employed in, for example, a mechanical engineering computer-aided design system to provide on a display screen two-dimensional images having three-dimensional qualities. These display images are rendered from image data that are arranged in a preselected format and describe or model a solid, physical, three-dimensional object.

One such image data format is constructive solid geometry (CSG), in which a solid object is modeled as a combination of primitive solids that may include but are not limited to blocks, spheres, and cylinders. Boolean set operators such as union and intersection are used to combine various ones of the primitive solids and, thereby, assemble a model of the solid object. For example, a solid object that includes a spherical knob at the end of a cylindrical shaft could be modeled as the union of a sphere and a cylinder.

The primitive solids employed in the CSG format provide a user with primary shapes from which he can assemble a model of a particular physical object. The primitive solids are, however, provided primarily as a convenience for the user. Within the graphics display system, each primitive solid is represented as a combination of one or more "halfspaces," which are themselves combined by Boolean set operators in a manner similar to that in which the primitive solids are combined. Although such a halfspace-based CSG format is sometimes called a normalized CSG format, it will hereinafter be distinguished from the primary solid-based CSG format only when necessary for clarity.

The CSG image data describing a solid object are represented in mathematical form. The physical, three-dimensional shape of the object is modeled in the CSG format with mathematical expressions defined in a mathematical, three-dimensional object space. Although it is a mathematical construct, the three-dimensional object space is often referred to as though it were a physical, three-dimensional space.

In a normalized CSG format, the boundary of each halfspace separates the object space into an interior region that lies inside the halfspace and an exterior region that lies outside the halfspace. The boundary of each halfspace is defined by an implicit function $f(x,y,z)=0$. The halfspace itself is defined by a mathematical expression of the form $f(x,y,z) \leq 0$, in which points that satisfy the inequality correspond to the interior of the halfspace. Examples of typical boundaries used to define halfspaces include spheres, cylinders of infinite length, and infinite planes.

The normalized CSG image data representing a primitive solid can comprise any number of halfspaces. For example, a primitive solid sphere is represented as a single spherical halfspace, and a primitive solid rectangular block is represented as the intersection of six orthogonally aligned planar halfspaces in which the boundaries of the six planar halfspaces define the six faces of the block.

Although the CSG image data representing a solid object provide a compact and complete description of the object, the rendering of a shaded image from the CSG image data is typically very slow. Some methods of rendering an image derive the surface of the object from the CSG image data. Such methods include a polygon approximation method, a solids intersection method, a ray casting method, and a spatial subdivision method.

The polygon approximation method approximates the surface of each primitive solid with a polyhedron that is formed from a plurality of adjacent polygons. For example, a cylinder of finite length could be approximated as a tubular, n-sided polyhedron in which the n sides are long, narrow polygons, (i.e. rectangles) that approximate the tubular shape of the cylinder.

In a model comprising more than one primitive solid, the polyhedral approximations for the different primitive solids are combined in accordance with a relatively simple polygon intersection algorithm. A problem with this method is that it generates a very large number of polygons for CSG image data representing even a relatively simple object, thereby requiring a great deal of memory space and a large number of computations to derive the surface of the object. As a consequence, the polygon approximation method is a relatively slow method of rendering images The solids intersection method employs a different intersection algorithm for each pair of primitive solids. This method suffers from the disadvantage of being inflexible in that it is cumbersome for a display system that employs more than three types of primitive solids. For example, a graphics display system that employs only planes and cylinders as its primitive solids requires three intersection algorithms to cover the different ways planes can intersect cylinders. In contradistinction, a system that employs planes, cylinders, cones, and tori as its primitive solids requires ten intersection algorithms and a variety of special rules to cover certain particular intersection possibilities.

Ray casting is a relatively simple, though computationally intensive, method of rendering an image from CSG image data. Ray casting determines, for each pixel in an image, which halfspace in the CSG image data is visible on the display screen. The CSG image data form a model of the object and are defined in an object space, which is considered to be aligned with and positioned behind the display screen. A "ray" is mathematically "directed" through each pixel on the display screen and toward the model. The "ray" passes at a perpendicular angle through the display screen and into the object space. The intersection and union information of all the CSG image data representing the object are reviewed to identify which one of the halfspaces in the CSG data is first intersected by the "ray" and is, therefore, to be rendered on the display screen. Each pixel for which there is an identified halfspace is rendered a color corresponding to the halfspace, thereby forming an image of the object in a pixel-by-pixel fashion. Ray casting can render a high quality image but is very slow because all of the CSG image data are reviewed for each pixel in the image.

Spatial subdivision, as described by Woodwark et al., "The Derivation of Graphics from Volume Models by Recursive Subdivision of the Object Space," *Procedinos CG-80 Conference* (1980), is a relatively fast method of rendering on a display screen an image of an object that is described by planar, linear halfspaces. The object space within which three-dimensional objects are described is considered to be aligned with and positioned behind the display screen. The object space is recursively subdivided into volume elements for each of which the halfspaces in the CSG image data are classified as being FULL, EMPTY, or PARTIAL.

Figure 1:
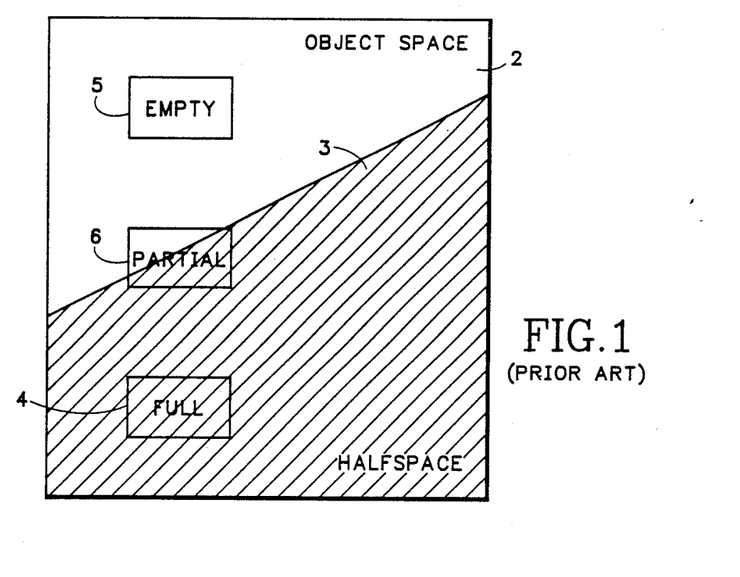
FIG. 1 is a diagram showing the classification of halfspaces in a prior art spatial subdivision method.

FIG. 1 shows in two dimensions an exemplary object space 2 in which a prior art planar halfspace 3 lies. At each level in the subdivision of object space 2, halfspace 3 is classified as FULL whenever a volume element 4 lies entirely inside the halfspace, as EMPTY whenever a volume element 5 lies entirely outside the halfspace, and as PARTIAL whenever a volume element 6 lies partly inside and partly outside the halfspace.

In volume elements having halfspaces classified as FULL or EMPTY, the CSG image data are simplified or reduced in accordance with simplification identities described by Woodwark et al. The simplification identities reduce the CSG image data by characterizing halfspaces as active or inactive depending on whether their classifications are material to the rendering of the image.

Volume elements in which the CSG image data have been reduced to a single active halfspace that is classified as FULL are assigned a color corresponding to the halfspace and, therefore, the model of the object. Volume elements in which the CSG image data have been reduced to include no active halfspaces correspond to an empty region in the object space through which other volume elements can be observed. Volume elements in which the CSG image include two or more active halfspaces that are classified as FULL are subdivided and reclassified.

Volume elements in which the image data are reduced to no active halfspaces or a single active halfspace that is classified as FULL correspond to portions of the display screen that can be rendered as an empty region or as part of the model, respectively. Such volume elements do not, therefore, require subdivision. Other volume elements undergo further subdivision until either the image data in each resulting volume element are reduced to no active halfspaces or a single active halfspace that is classified as FULL, or until the length of a side of the resulting volume element is equal to the length of an image pixel on the display screen. Such a volume element is called a voxel. Since the image data are typically reduced to no active halfspaces or a single active halfspace that is classified as FULL for volume elements that are substantially larger than a voxel, spatial subdivision is a much faster method of rendering images than is ray casting.

The volume elements are of either a cubical or a rectangular parallelepiped shape. The spatial subdivision method of Woodwark et al., which is directed only to planar halfspaces, employs a relatively simple planar classification method for classifying such halfspaces. In particular, the boundaries of planar halfspaces are defined by monotonic, linear functions. In the classification of such halfspaces it is, therefore, sufficient to determine whether each corner or vertex of a volume element is inside the halfspace.

For example, a planar halfspace can be defined by the inequality $f(x,y,z) \leq 0$ in which $f(x,y,z)$ is a linear, implicit function. Whenever the value of the function $f(x,y,z)$ is less than or equal to zero at each of the corners of a volume element, the halfspace is classified as FULL for that volume element. Whenever the value of the function $f(x,y,z)$ is greater than zero at each of the corners of the volume element, the halfspace is classified as EMPTY for that volume element. Whenever the value of the function $f(x,y,z)$ is greater than zero at one or more of the corners and less than or equal to zero at another corner, the halfspace is classified as PARTIAL for that volume element.

Typically, some volume elements in which the image data are reduced to a single active halfspace that is classified as FULL are not rendered on the display screen. Such volume elements are positioned behind other volume elements having single active halfspaces that are classified as FULL and are, therefore, occluded. As a result, it is necessary in the rendering of the image to determine not only whether a volume element has a single active halfspace that is classified as FULL, but also whether such a volume element is occluded by another volume element having a single active halfspace that is classified as FULL. The three-dimensional appearance of the image is enhanced by not rendering occluded volume elements.

The detection of occluding volume elements not only enhances the three-dimensional appearance of an image, but also increases the speed at which the image is rendered. Subdividing the object space sequentially from the front of the object space (i.e., near the display screen) to the rear of the object space renders unnecessary the classification of the halfspaces in any occluded volume elements, and thereby reduces the number of classifications and increases the speed at which the image is rendered.

The classification method of Woodwark et al. cannot accurately classify nonplanar halfspaces. In particular, a typical nonplanar halfspace cannot be classified in accordance with whether each corner of a volume element is inside the halfspace. The reason is that a nonplanar halfspace could contain each corner of a volume element while not containing the entire volume element. Since such a halfspace would be incorrectly classified, the resulting image would be incorrectly rendered. As a result, the spatial subdivision method as developed by Woodwark et al., which method employs the planar classification method, cannot be used to render images represented by nonplanar halfspaces.

SUMMARY OF THE INVENTION

An object of this invention is, therefore, to provide for three-dimensional graphics display systems a method of rendering an image that is represented by data arranged in a constructive solid geometry format.

Another object of this invention is to provide such a method that is compatible with data representing halfspaces that have boundaries defined by nonlinear functions that represent nonplanar objects.

A further object of this invention is to provide such a method that rapidly renders the image.

Still another object of this invention is to provide a display system in which such a method can be implemented.

The present invention comprises a method of and an apparatus for rendering on a display screen an image of a three-dimensional object. The image is represented by image data that are arranged in a constructive solid geometry format. The image includes at least one halfspace whose boundary divides an object space into an interior region lying inside the halfspace and an exterior region lying outside the halfspace. The object space is considered to be aligned with and positioned behind the display screen, which in effect functions as a window through which the object space is observed.

In a first preferred embodiment, the boundaries of the halfspaces are defined by implicit mathematical functions for each one of which there exists a first partial derivative with respect to each variable. In a second preferred embodiment, the boundaries of the halfspaces are defined by implicit mathematical functions for each one of which there exists a Taylor series expansion. For both embodiments, the function defining the boundary of a halfspace may represent any one of a variety of nonlinear relationships, which would, therefore, correspond to a halfspace of nonplanar shape.

Each halfspace is defined by a mathematical expression of the form $f(x,y,z) \leq 0$, in which the implicit function $f(x,y,z)$ defines the boundary of the halfspace and points that satisfy the inequality correspond to the interior of the halfspace. The method of rendering the image includes subdividing the object space into volume elements of either cubical or rectangular parallelepiped shape. For each volume element, an upper bound and a lower bound are calculated for the values of each function defining the boundary of a halfspace. A determination is made as to which ones of the upper and lower bounds of the functions satisfy the inequalities defining the interior of the halfspaces and which, therefore, correspond to locations that are inside the halfspaces. Whenever both bounds of a function describing a halfspace lie inside or outside a volume element, the halfspace is classified as either FULL or EMPTY, respectively. Otherwise, the halfspace is classified as PARTIAL.

Halfspaces that are within a volume element and are classified as either FULL or EMPTY are used in connection with simplification identities to reduce the CSG image data corresponding to the volume element. Halfspaces reduced from the CSG image data are designated inactive, and the remaining nonreduced halfspaces are designated active. Whenever the image data for a volume element are simplified to no active halfspaces or a single active halfspace classified as FULL, the volume element corresponds to an empty region or is rendered in a color corresponding to the halfspace, respectively. Otherwise, the volume element is subdivided and the halfspaces that are active in the CSG image data are reclassified for each of the volume elements resulting from the subdivision.

The subdivision of the object space is repeated until the image data for each volume element are simplified to represent no active halfspaces or one active halfspace that is classified as FULL, or until the length of a side of the volume element is equal to the length of a side of a pixel. Such a volume element is called a voxel. Whenever the image data for a voxel include two or more active halfspaces classified as FULL, the voxel is rendered according to a relatively simple predetermined rule such as: "Render the voxel in accordance with the first-listed active halfspace in the CSG image data." An alternative predetermined rule is that voxels can be rendered in accordance with the ray casting method. Since voxels correspond to individual pixels and typically have very few active halfspaces, the ray casting method can render voxels very quickly.

The ray casting method can also be used in connection with the present invention to render volume elements that are larger than a voxel. In such a hybrid system, the method of this invention is used to simplify the CSG image data until a volume element has fewer than, for example, twelve active halfspaces. The ray casting method is then used to complete the rendering of the volume element. This hybrid system is capable of quickly rendering high quality images.

Since the object space and its corresponding volume elements are considered to be aligned with and positioned behind the display screen, only the rectangular front faces of volume elements are visible on the display screen. As a result, volume elements assigned colors corresponding to the object are rendered on the display screen as rectangular portions of the image. Volume elements that correspond to empty regions appear on the display screen as a rectangle that is the color of the display background (e.g., black) unless other volume elements aligned with the empty volume elements are rendered a color corresponding to the object.

In the first preferred embodiment, the identification of the upper and lower bounds of a function that defines the boundary of a halfspace within a volume element entails identifying all of the extrema of the function that lie within or on the boundary of the volume element. The value of the function is determined at each of the extrema to determine whether all of the extrema of the function for the volume element lie inside the halfspace. This method is called the exact classification method and uses only the first partial derivatives of the functions defining the boundaries of the halfspaces. However, this method is limited to halfspaces having boundaries that are defined by linear and quadratic functions, which boundaries include planes, spheres, cylinders, and conics.

In the second preferred embodiment, the upper and lower bounds are calculated as approximations to the absolute maximum and minimum values of the function, respectively, that lie in the volume element. In particular, the upper bound is calculated so that its value is greater than or equal to the maximum value of the function in the volume element. The lower bound is calculated so that its value is less than or equal to the minimum value of the function in the volume element. A halfspace is classified as to whether both of these approximate bounds correspond to locations that lie inside the halfspace. This method is called the "approximate" classification method and requires only that Taylor series expansions exist for the functions defining the boundaries of the halfspaces.

The classification methods of the first and second preferred embodiments differ conceptually in that they provide, respectively, exact and approximate identification of the bounds of a function representing a halfspace. The identification of the extrema of a function in accordance with the first preferred embodiment exactly identifies the bounds of the function. The absolute upper and lower bounds of a function calculated in accordance with the second preferred embodiment provide one upper bound and one lower bound by which a halfspace can be approximately classified.

The second preferred embodiment provides for faster classification of halfspaces and a consequent faster rendering of images than does the first preferred embodiment. In particular, the second preferred embodiment employs fewer calculations and less memory space for storing intermediate results than does the first preferred embodiment. The second preferred embodiment will, however, sometimes erroneously classify as PARTIAL a halfspace that is actually FULL or EMPTY for a particular volume element. Such errors result from the approximation of the upper and lower bounds of the function. Since a PARTIAL classification results only in further subdivision of a volume element, such errors do not cause an incorrect rendering of the image. Classification errors generated by this embodiment only increase the number of subdivisions and classifications that are required to render an image. Despite such erroneous classifications, the second preferred embodiment typically renders an image faster than does the first preferred embodiment.

The second preferred embodiment is compatible with halfspaces having boundaries defined by linear and quadratic functions; higher-order polynomial functions that define, for example, tori; and some non-polynomial functions that have infinite Taylor series that can be bounded on the object space such as, for example, a function that defines a helix.

Additional objects and advantages of the present invention will be apparent from the following detailed description of two preferred embodiments thereof, which proceeds with reference to the accompanying drawings.

DESCRIPTION OF PREFERRED EMBODIMENTS

Figure 2:
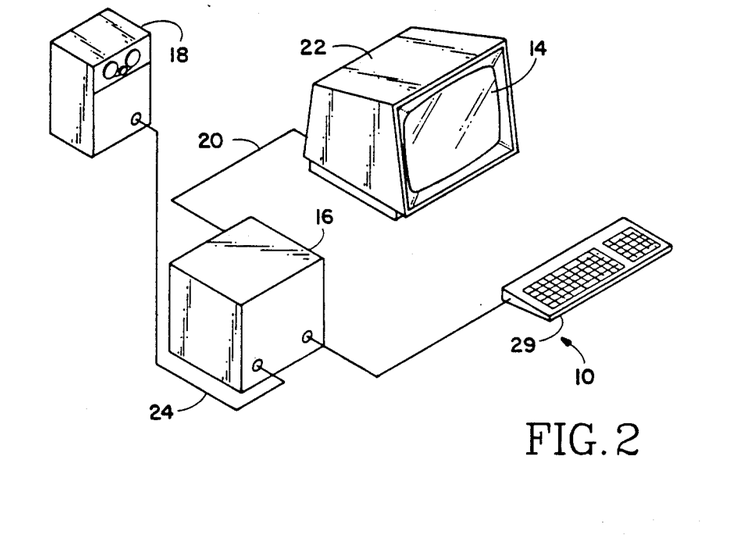
FIG. 2 is a diagram of a three-dimensional graphics display system that includes an image data processor in which the method of this invention is

FIG. 2 is a diagrammatic representation of a three-dimensional graphics display system 10 that employs an image data processing means or processor 12 (FIG. 6) of the present invention for rendering on a display screen 14 an image representing a three-dimensional physical object. The image has three-dimensional qualities and includes perspective, hidden-surface removal, shading, or other cues to assist an observer (not shown) to visualize the three-dimensional properties of the object. Display system 10 can be used as a component of, for example, a mechanical engineering computer-aided design system.

Image data processor 12 comprises a portion of a display controller unit 16 that receives image data from an information source such as a host computer 18. The information source can also comprise a disk drive, a telecommunication data link, or a local memory circuit within display system 10. Display controller unit 16 provides on a display data link 20 control signals that direct a cathode-ray tube 22 to form on display screen 14 graphics display images corresponding to the image data provided by computer 18.

Display controller unit 16 receives from computer 18 on a computer output data bus 24 image data that are arranged in a constructive solid geometry (CSG) format. The CSG image data include a combination of halfspaces having boundaries representing, for example, planes, cylinders, spheres, and hyperboloids; a color designation for each one of the halfspaces; and Boolean set operators such as union and intersection that combine the halfspaces, as described below in greater detail. The boundaries of the halfspaces are defined in a three-dimensional, mathematical object space 28 (FIG. 3) by mathematical functions expressed in the Cartesian coordinate system variables x, y, and z. Linear functions of the variables x, y, and z define the boundaries of planar halfspaces; and quadratic functions define the boundaries of cylindrical, spherical, and hyperboloidal halfspaces. It will be appreciated, however, that other nonplanar halfspaces can be used in accordance with the present invention.

The CSG image data are generated by a solids modeler program that resides in computer 18 and is a part of the computer-aided design system. The solids modeler program allows CSG image data to be edited by combining, modifying, and rearranging the halfspaces and Boolean set operators that represent an object. An operator employs a keyboard 29 or a pointing device such as a mouse (not shown) or light pen (not shown) for providing to display system 10 and computer 18, for example, commands for editing the image data and displaying the corresponding image.

Figures 3, 7:
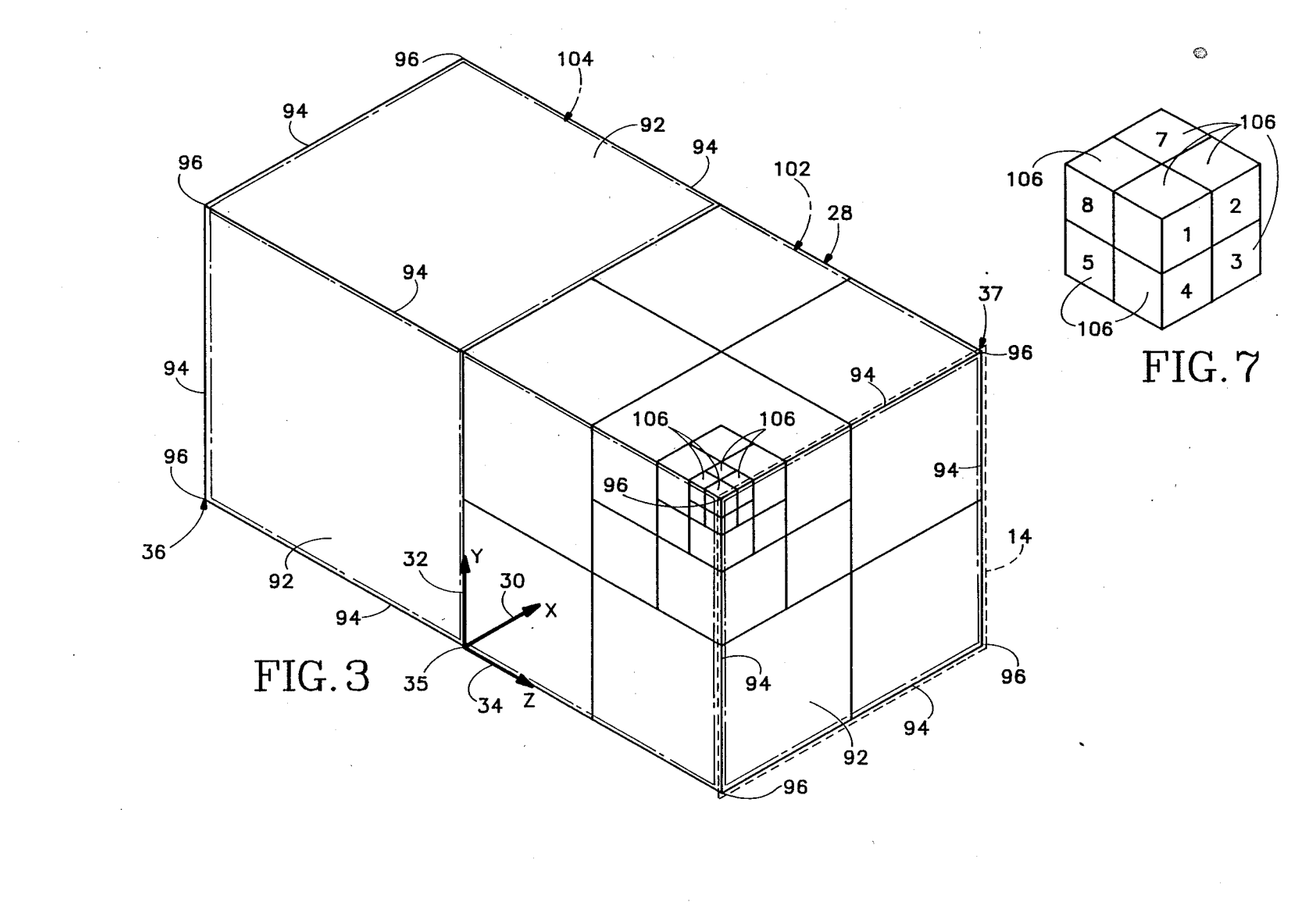
FIG. 3 is a schematic diagram of an exemplary three-dimensional object space in which CSG image data are defined.
FIG. 7 is a diagram showing the order in which eight volume elements of a single subdivision level are classified.

FIG. 3 shows three-dimensional object space 28 in which physical objects are represented or modeled by CSG image data. Object space 28 is a mathematical construct representing a real, three-dimensional space that is positioned behind display screen 14 (shown in phantom) of cathode-ray tube 22 (FIG. 2). Object space 28 has a rectangular cross-sectional shape, but could, for example, have a square cross-sectional shape. Display screen 14 corresponds to a viewing window through which an observer views object space 28. An image rendered on display screen 14 corresponds, therefore, to a view of a CSG model that is defined in object space 28.

The dimensions of object space 28 are defined with reference to a Cartesian coordinate system, which has an x-axis 30 aligned in a first horizontal direction representing width on display screen 14, a y-axis 32 aligned in a vertical direction representing height on display screen 14, and a z-axis 34 aligned in a second horizontal direction representing depth in object space 28.

Display screen 14 is capable of displaying a preselected number of pixels. Each of the axes 30, 32, and 34 is divided into calibrated units, each unit having a length that equals the length of a side of a pixel on display screen 14. The pixels in a high-resolution display system are relatively small, and each axis includes a relatively large number of units. The pixels in a low-resolution display system are relatively large, and each axis includes a relatively small number of units. Although it is compatible with and has been implemented in both high- and low-resolution display systems, the present invention will be described with reference to a low-resolution system in which x-axis 30, y-axis 32 and z-axis 34 have lengths equal to the lengths of 16 pixels, 16 pixels, and 32 pixels, respectively. Object space 28 has an extreme minimum corner 36 located at position coordinates (0,0,−16) and an extreme maximum corner 37 located at position coordinates (16,16,16), relative to a coordinate system origin 35 having position coordinates (0,0,0,).

Figure 4:
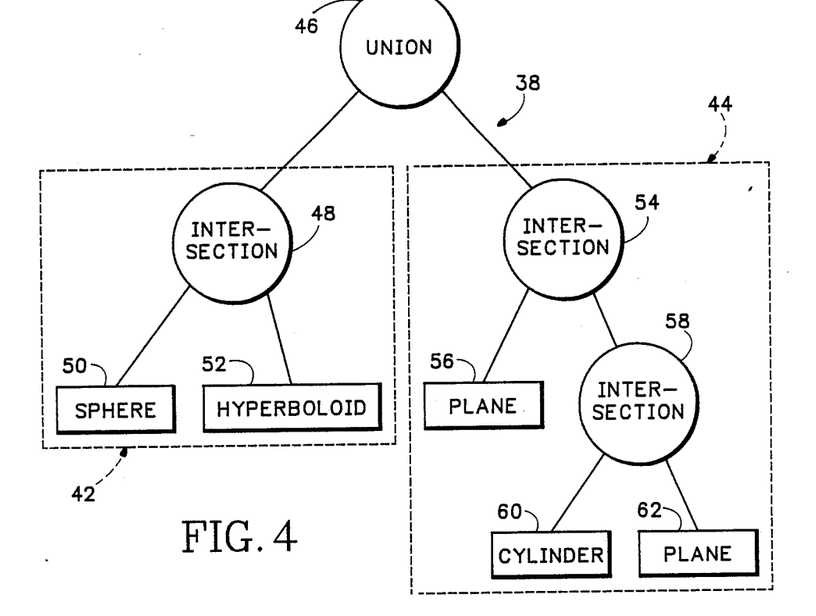
FIG. 4 is a tree diagram showing the logic operations carried out in the synthesis of an image exemplary CSG image data.
Figure 5:
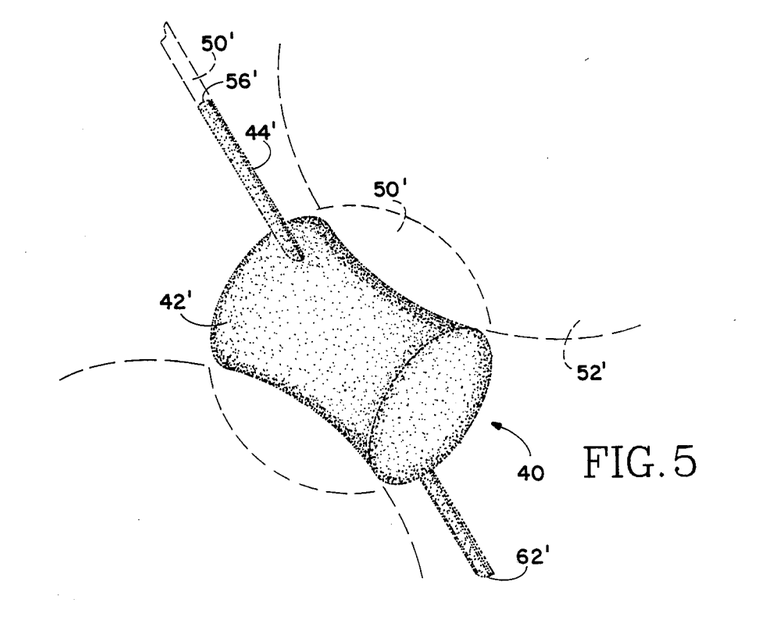
FIG. 5 is a two-dimensional image representing a three-dimensional object corresponding to the CSG image data of FIG. 3 and which is rendered in accordance with this invention.

FIGS. 4 and 5 show a schematic representation of exemplary CSG image data 38 and an image 40 rendered therefrom, respectively. The components of image 40 corresponding to those of image data 38 are identified by identical reference numerals followed by primes. Image 40 represents an apple core 42' on a skewer 44'.

With reference to FIG. 4, CSG image data 38 comprise a union 46 of image data representing apple core 42 and skewer 44. Apple core 42 is formed by an intersection 48 of a halfspace sphere 50 and a halfspace hyperboloid 52. Skewer 44 is formed by an intersection 54 of a halfspace infinite plane 56 with an intersection 58 of a halfspace infinite cylinder 60 and a halfspace infinite plane 62.

CSG image data 38 are generated by the solids modeler program that resides in computer 18 and are transmitted from computer 18 to image data processor 12 (FIG. 6) as a signal representing a string of alphanumeric characters. The logic expression for image data 38 is:

((50·52)+(56·(60·62))), where
- · and + represent the Boolean set operators intersection and union, respectively;
- (50·52) represents intersection 48 of sphere 50 and hyperboloid 52, thereby forming image data representing apple core 42, (FIG. 5);
- (60·62) represents intersection 58 of cylinder 60 and plane 62;
- (56·(60·62)) represents the intersection 4 of plane 56 with the intersection 58 of cylinder 60 and plane 62, thereby forming image data representing skewer 44' (FIG. 5);
- (56·(60·62))+(50·52)) represents the union 46 of apple core 42 and skewer 44, thereby forming image data 38 representing image 40 (FIG. 5); and
- each of the reference numerals 50, 52, 56, 60, and 62 represents a set of scalar coefficients that represent the function defining the boundary of the corresponding halfspace.

The solids modeler program residing within computer 18 generates the CSG image data 38, which can alternatively be arranged in binary or different alphanumeric formats. The solids modeler program generates for each of the halfspaces 50, 52, 56, 60, and 62 a set of coefficients for a general function F(x,y,z). These sets of coefficients for the halfspaces 50, 52, 56, 60, and 62 form the coefficients for the respective functions $f_{50}$, $f_{52}$, $f_{56}$, $f_{60}$, and $f_{62}$ that define the boundaries of halfspaces. The particular functions $f_{50}$, $f_{52}$, and $f_{60}$, which define the boundaries of halfspace sphere 50, halfspace hyperboloid 52, and halfspace cylinder 60, are in quadratic form.

The functions $f_{56}$ and $f_{62}$, which define the boundaries of halfspace planes 56 and 62, are in linear form. The general function F(x,y,z) employed by the solids modeler program and from which the functions $f_{50}$, $f_{52}$, $f_{56}$, $f_{60}$, and $f_{62}$ are derived is of the quadratic form:

$$F(x,y,z) = ax^2 + by^2 + cz^2 + dxy + eyz + fxz + gx + hy + iz + j.$$

Different ones of halfspaces 50, 52, 56, 60, and 62 typically have different values for each of the coefficients a, b, c, d, e, f, g, h, i, and j ("a−j"). For example, each of the coefficients a-j for halfspace sphere 50 is typically of a different nonzero value; whereas only the coefficients g, h, i, and j can be of nonzero values for halfspace planes 56 and 62.

Since this invention is compatible with halfspaces having boundaries that are defined by higher-order polynomials and other nonlinear functions such as, for example, trigonometric functions, the boundaries of such halfspaces will be defined by functions of forms other than those of the above-described general function F(x,y,z), which is presented as an example only.

Figure 6:
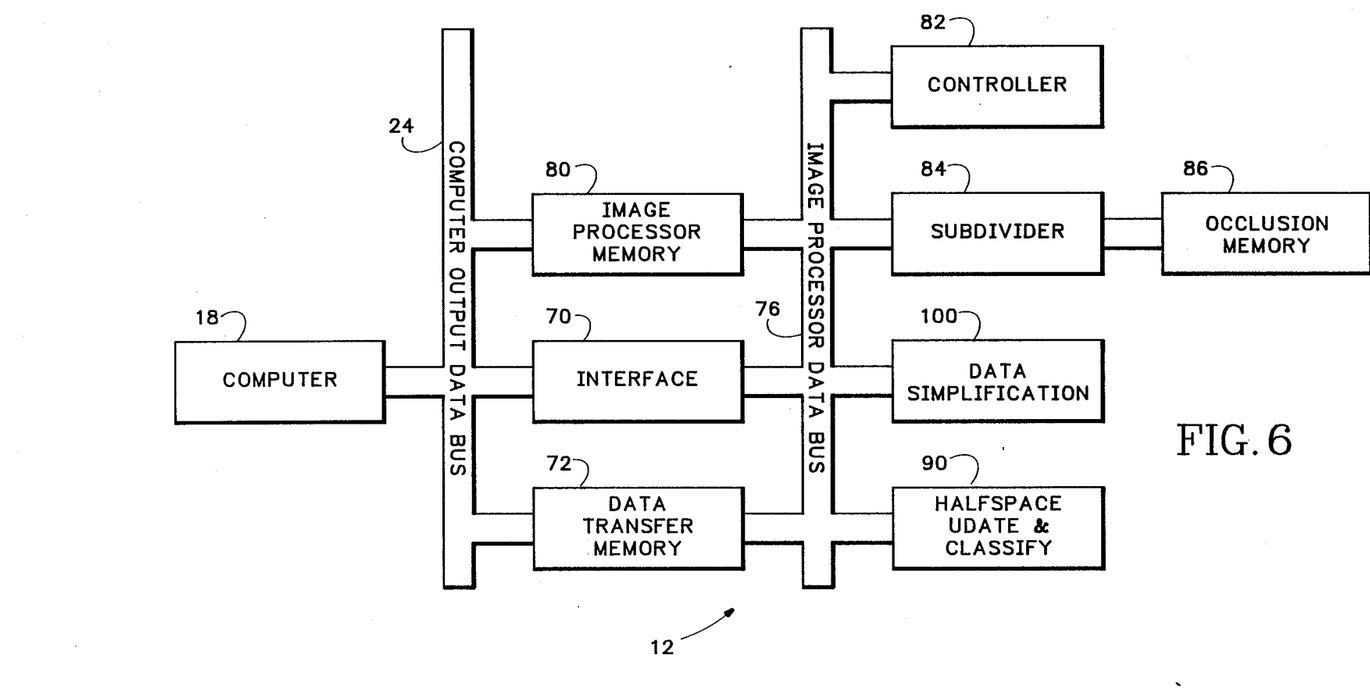
FIG. 6 is a simplified block diagram of an image data processor that renders an image in accordance with this invention.

FIG. 6 shows a simplified block diagram of image data processor 12, the operation of which is described in connection with exemplary CSG image data 38 of FIG. 4 and the corresponding image 40 of FIG. 5. Image data processor 12 communicates with computer 18 through an interface means or circuit 70 and a data transfer memory circuit 72. Interface circuit 70 is connected between computer output data bus 24 and an image processor data bus 76. Signals transmitted by way of interface circuit 70 include image display command signals by which computer 18 directs image data processor 12 to render image 40 from image data 38 and image display status signals by which image data processor 12 notifies computer 18 of the display status of image 40.

Data transfer memory 72 is also connected between computer output data bus 24 and image processor data bus 76. Data transfer memory 72 provides a memory buffer between computer 18 and image data processor 12. For example, CSG image data 38 directed from computer to image data processor 12 are transmitted directly into data transfer memory 72 and are temporarily stored there until being directed by way of data bus 76 into an image processor memory circuit 80. The transfer of image data 38 from memory buffer 72 to image processor memory 80 is controlled by an image processor controller circuit 82.

An object space subdivider means or circuit 84 is electrically connected to data bus 76 and responds to controller 82 for recursively subdividing object space 28 (FIG. 3) into volume elements. Subdivider circuit 84 communicates with and applies to an occlusion memory circuit 86 signals indicating which ones of the pixels on display screen 14 (FIG. 2) have been rendered in accordance with image data 38. The rendered pixels are aligned with volume elements in which the CSG image data have been reduced to a single active halfspace that is classified as FULL, as described below in greater detail. Each pixel that is rendered is also aligned with a region of object space 28 that is occluded by the volume element in which the image data are reduced to a single halfspace classified as FULL. Occlusion memory 86 stores occlusion data corresponding to pixels that are aligned with occluding volume elements.

A halfspace update and classify means or circuit 90 is electrically connected to data bus 76 and responds to controller 82 for classifying the halfspaces in CSG image data 38 for each volume element generated by subdivider circuit 84. In a first preferred embodiment that employs an "exact" classification method, update and classify circuit 90 calculates the first partial derivatives of each of the functions $f_{50}$, $f_{52}$, $f_{56}$, $f_{60}$, and $f_{62}$ with respect to the variables x, y, and z. These partial derivatives are used to identify all of the extrema within, or on the boundary of, a volume element for each function which defines the boundary of a halfspace that is active in the volume element. The values of the functions at the extrema are evaluated to determine whether the volume element is located inside the corresponding halfspaces.

The identification of the extrema allows both planar and nonplanar halfspaces to be accurately classified. In connection with a planar halfspace, the extrema occur at the corners of the volume element. In connection with a nonplanar halfspace, the extrema provide information concerning the halfspace at locations other than the corners of the volume element, thereby allowing the nonplanar halfspace to be accurately classified. Such information is important because a nonplanar halfspace could contain each corner of a volume element while not containing the entire volume element. Without the information provided by the extrema, such a nonplanar halfspace could not be correctly classified, thereby causing the image to be rendered incorrectly.

Extrema at which the functions satisfy the expressions defining the halfspaces correspond to locations that lie inside the halfspaces. For each volume element in which all of the extrema of a function lie at locations that are inside the corresponding halfspace, the halfspace is classified as FULL. For each volume element in which all of the extrema of a function lie at locations outside the corresponding halfspace, the halfspace is classified as EMPTY. For each volume element in which at least one extremum of a function lies inside the corresponding halfspace and another extremum is outside the halfspace, the halfspace is classified as PARTIAL.

The extrema inside and on the boundary of a volume element are identified by calculating the first partial derivatives of the functions $f_{50}$, $f_{52}$, $f_{56}$, $f_{60}$, and $f_{62}$ with respect to the variables x, y, and z. For purposes of simplicity, the functions $f_{50}$, $f_{52}$, $f_{56}$, $f_{60}$, and $f_{62}$ are generally designated herein as the function f(x,y,z) or f. The first partial derivatives of the function f with respect to the variables x, y, and z are denoted $f_x$, $f_y$, and $f_z$, respectively. Processes or calculations that are described below in connection with the function f are, therefore, repeated for each one of the functions $f_{50}$, $f_{52}$, $f_{56}$, $f_{60}$, and $f_{62}$.

With reference to FIGS. 3 and 6, the operation of image data processor 12 is described with reference to the first preferred embodiment of update and classify circuit 90. To initialize image data processor 12, controller 82 establishes limits or ranges in subdivider circuit 84 for x-axis 30, y-axis 32, and z-axis 34. The ranges of these axes define the boundary of object space 28. Controller 82 also sets the occlusion data in occlusion memory 86 to indicate that no pixels have been rendered.

CSG image data are transmitted from computer 18, through data transfer memory 72 and to image processor memory 80. Subdivider circuit 84 designates object space 28 as the initial or level 0 volume element. The level of a volume element corresponds to the number of subdivisions of the object space by which the volume element is formed and is, therefore, inversely proportional to the size of the volume element.

As the level 0 volume element, object space 28 is the volume element that is classified first and is considered the current volume element. Object space 28 has an extreme minimum corner 36 located at the point (0,0,−16) and an extreme maximum corner 37 located at the point (16,16,16).

Controller 82 directs subdivider circuit 84. to review the occlusion data in occlusion memory 86 and to identify pixels that have been rendered. Since the current volume element is the level 0 volume element, no pixels have been rendered. Controller 82 then directs update and classify circuit 90 to locate all of the extrema of the functions that define halfspaces in the level 0 volume element (i.e., object space 28). The extrema are located by identifying all the local extrema of f(x,y,z) that lie in the interior of the volume element or on any edge, face, or vertex of the volume element.

To locate all of the extrema that are in, but not on the boundary of, the current volume element, update and classify circuit 90 simultaneously solves the equations $f_x=0$, $f_y=0$, $f_z=0$, for the variables x, y, and z. The value of the function f(x,y,z) is calculated for any solutions that lie inside the current volume element.

To locate the local extrema that lie on the boundary of the current volume element, there are designated an extreme minimum corner $(x_0,y_0,z_0)$ and an extreme maximum corner $(x_0+x_1,y_0+y_1,z_0+z_1)$ of the volume element, in which $x_1$, $y_1$, and $z_1$ are positive values. Each edge of the volume element is arranged to be parallel to one of the coordinate axes.

With reference to FIG. 3, the boundary of a volume element (e.g., object space 28 as the level 0 volume element) comprises six faces 92 (three shown), twelve marginal edges 94 (nine shown), and eight vertices 96 (seven shown). Identification of all extrema lying on the boundary of the volume element requires that the extrema that lie on the faces 92, edges 94, and vertices 96 of the volume element be separately identified.

Identification of the extrema lying on the six faces of a volume element entails evaluating the partial derivatives of the halfspace function f on each of the faces 92. Extrema lying on volume element faces 92 that are, for example, perpendicular to x-axis 30, are identified by setting the value of the variable x to its minimum value $x_0$ (i.e.. the value "0" for the current level 0 volume element) and its maximum value $x_0+x_1$ (i.e.. the value "16" for the current level 0 volume element) and simultaneously y and z. The value of the function f is calculated for solutions that correspond to one of the current volume element faces 92 that are perpendicular to x-axis 30. Extrema lying on volume element faces 92 that are perpendicular to y-axis 32 and z-axis 34 are 0 identified in a similar manner.

Identification of the extrema lying on the twelve marginal edges 94 of a volume element entails evaluating the partial derivatives of the halfspace function f for each of the edges 94. There are four edges of the volume element parallel to each of the x-axis 30, y-axis 32, and z-axis 34. Extrema lying on the four edges parallel to, for example, x-axis 30, are identified by setting the values of the variables y and z to the respective values $y_0$ and $z_0$, $y_0$ and $z_0+z_1$, $y_0+y_1$ and $z_0$, and $y_0+y_1$ and $z_0+z_1$. The equation $f_x=0$ is solved for the variable x for each of these pairs of fixed y and z values. The value of the function f is calculated for any solutions that correspond to an edge of the current volume element. Extrema lying on volume element edges 94 that are parallel to y-axis 32 and z-axis 34 are identified in a similar manner.

Since the eight vertices 96 lie at extreme corners of the volume element, the identification of extrema lying at the vertices entails calculating the value of the function f at each of the vertices.

The interior of the halfspace represented by the function f is defined by the expression $f \leq 0$. Whenever the values of the function f obtained for all of the extrema in the above-described evaluations are less than or equal to zero, update and classify circuit 90 classifies the corresponding halfspace as FULL for that volume element. Whenever the values of the function f obtained in all of the evaluations are greater than zero, update and classify circuit 90 classifies the corresponding halfspace as EMPTY for the volume element. Otherwise, update and classify circuit 90 classifies the corresponding halfspace as PARTIAL.

The PARTIAL classification can be generated any time the value of the function f changes between positive and negative values during the evaluation of the extrema for a function in the volume element. The classifications of FULL and EMPTY are, however, not established until all evaluations have taken place.

In the case of halfspaces having boundaries defined by a general function of the above-described form F(x,y,z), all of the equations resulting from the first partial derivatives are of a linear form. As a result, systems of linear equations are solved in the identification of the extrema, thereby allowing the identifications to be carried out by computer calculations that use only binary shifts and additions. Such calculations are carried out very rapidly on a computer.

Whenever a halfspace is classified as FULL or EMPTY for a volume element, a data simplification circuit 100 that is electrically connected to data bus 76 and responsive to controller 82 uses the FULL or EMPTY classification to simplify the CSG image data for that volume element. Data simplification circuit 100 employs simplification identities that are valid for any general halfspace H. The identities are:

(1) H union EMPTY=H;
(2) H union FULL=FULL;
(3) H intersection EMPTY=EMPTY; and
(4) H intersection FULL=H.

Identity (1) indicates that, if in the union of two halfspaces one of them is classified as EMPTY, the classification of the union is determined by the classification of the halfspace H. The EMPTY halfspace is, therefore, inactive and the halfspace H is active.

Identity (2) indicates that, if in the union of two halfspaces one of them is classified as FULL, the FULL halfspace determines the classification of the union and is active. The classification of the halfspace H is immaterial to the classification of the union and is, therefore, inactive.

Identity (3) indicates that, if in the intersection of two halfspaces one of them is classified as EMPTY, the EMPTY halfspace determines the classification of the intersection and is active. The classification of the halfspace H is immaterial to the classification of the intersection and is, therefore, inactive.

Identity (4) indicates that, if in the intersection of two halfspaces one of them is classified as FULL, the classification of the intersection is determined by the classification of the halfspace H. The FULL halfspace is, therefore, inactive and the halfspace H is active.

In connection with the classification of the level 0 volume element, update and classify circuit 90 classifies halfspace plane 62, (FIG. 5) as FULL and the other halfspaces as PARTIAL. Based upon these classifications, data simplification circuit 100 simplifies the intersection 58 (FIG. 4) of cylinder 60 and plane 62 in accordance with identity (4). The intersection 58 of cylinder 60 and plane 62 is simplified to cylinder 60, thereby rendering plane 62 inactive.

Since the simplified CSG image data for the level 0 volume element comprise more than a single halfspace designated as FULL, subdivider circuit 84 subdivides the level 0 volume element. Since the level 0 volume element (i.e.. object space 28) is of a rectangular parallelepiped shape, it is divided in half along its axis of greatest length (i.e. z-axis 34), thereby forming front and back cubical level 1 volume elements 102 and 104, respectively (outlined in phantom in FIG. 3). Volume element 102 is positioned in front of volume element 104. Since the level 1 volume elements 102 and 104 are of cubical shape, any subsequent subdivisions bisect the volume elements along each side to form eight cubical higher level volume elements.

Volume elements are evaluated in a preselected order in which the front level 1 volume element 102 is evaluated first. Occlusion memory 86 indicates that no pixels have as yet been rendered. Update and classify circuit 90 classifies the halfspaces that remain in the CSG image data after the simplification for the level 0 volume element. The classification, simplification, and subdivision of the front level 1 volume element 102 are repeated until the image data in every part of the volume element is reduced to no active halfspaces, a single halfspace classified as FULL, or until the volume elements are the size of a voxel. Whenever the image data for a voxel include two or more active halfspaces, the voxel is rendered in accordance with a predetermined rule such as, for example, "Render the voxel in accordance with the first active halfspace remaining in the binary or alphanumeric string representing the CSG image data." In the present example, representative voxels 106 (FIG. 3) are shown. After the classification of the front level 1 volume element is completed, the classification of the back level I volume element 104 is undertaken in a similar manner.

FIG. 7 shows the preselected order in which subdivider circuit 84 classifies eight volume elements that correspond to voxels 106. In particular, numerals 1-8 are on the voxels 106 to designate from first to last, respectively, the order in which the voxels are classified. The numeral 6 is not shown because the voxel to which it corresponds is hidden from view. The preselected order is configured so that a shift from one volume element to a next succeeding one requires a move along only one of the axes 30, 32, and 34, thereby requiring a change of only one of the variables x, y, and z.

In accordance with the preselected order, volume elements at a particular subdivision level are evaluated such that potentially occluding volume elements are evaluated first (e.g., the voxels 106 that are designated 1-4). Whenever there is more than one potentially occluding volume element at a particular subdivision level (i.e., in a subdivision that generates eight higher level volume elements), the evaluation of the volume elements proceeds in a clockwise order from the one in the upper left corner (e.g., voxel 106 that is designated numeral 1). Finally, a volume element at a particular subdivision level is completely evaluated at any necessary higher level volume elements before the next volume element at the particular subdivision level is evaluated (e.g., the front, upper left cube of object space 28 in FIG. 3 is completely classified before the classification of the front, upper right cube is started).

In a second preferred embodiment, halfspace update and classify circuit 90 employs an approximate classification method in which circuit 90 calculates for each of the particular functions defining the boundaries of the halfspaces 50, 52, 56, 60, and 62 a Taylor series expansion. In particular, the Taylor series expansion of the function f is used to calculate an upper bound that is greater than or equal to the maximum and a lower bound that is less than or equal to minimum of the values of the function within the volume element. Whenever both of the bounds show that all points of the volume element are inside the halfspace, the halfspace is classified as FULL. Whenever both of the bounds correspond to locations that are outside the halfspace, the halfspace is classified as EMPTY. Whenever one of the bounds is inside the halfspace and the other one is outside the halfspace, the halfspace is classified as PARTIAL.

For each volume element there are designated an extreme minimum corner $(x_0, y_0, z_0)$ and an extreme maximum corner $(x_0+x_1, y_0+y_1, z_0+z_1)$. Each of the edges of the volume element is parallel to one of the coordinate axes and each of the constants $x_1, y_1, z_1$ is positive. For a particular function $f(x,y,z)$ that defines the boundary of a halfspace, the Taylor series about $(x,y,z)$ for any point $(x+dx, y+dy, z+dz)$ within the volume element is:

$$f(x+dx, y+dy, z+dz) = f(x,y,z) +$$
$$f_x(x,y,z)dx + f_y(x,y,z)dy + f_z(x,y,z)dz +$$
$$1/2 \ [f_{xx}(x,y,z)dx^2 + f_{yy}(x,y,z)dy^2 +$$
$$f_{zz}(x,y,z)dz^2] + f_{xy}(x,y,z)dxdy +$$
$$f_{xz}(x,y,z)dxdz + f_{yz}(x,y,z)dydz + R$$

where $f_x(x,y,z)$, $f_y(x,y,z)$, and $f_z(x,y,z)$ are the first partial derivatives of the function $f(x,y,z)$ with respect to the variables x, y, and z, respectively; and $f_{xx}(x,y,z)$, $f_{yy}(x,y,z)$, and $f_{zz}(x,y,z)$, $f_{xy}(x,y,z)$, $f_{xz}(x,y,z)$, and $f_{yz}(x,y,z)$ are the second partial derivatives of the function $f(x,y,z)$ with respect to the variables x and x, y and y, z and z, x and y, x and z, and y and z, respectively; and R represents an error term if the function $f(x,y,z)$ is of a general, nonlinear form or higher order derivatives if $f(x,y,z)$ is a polynomial of degree greater than 2. If $f(x,y,z)$ is a quadratic or linear function, then R=0.

Update and classify circuit 90 employs a modified Taylor series expansion to calculate the upper and lower bounds of the values of the function $f(x,y,z)$ in a volume element. The derivatives of the function $f(x,y,z)$ are generally designated $f_a(x,y,z)$, and functions $f_a^+(x,y,z)$ and $f_a^-(x,y,z)$ are defined in which:

$f_a^+(x,y,z) = f_a(x,y,z)$, if $f_a(x,y,z)$ is positive 0, otherwise;

$f_a^-(x,y,z) = f_a(x,y,z)$, if $f_a(x,y,z)$ is negative 0, otherwise.

The upper bound of a function $f(x,y,z)$ that defines a halfspace in a volume element having an extreme minimum corner $(x_0, y_0, z_0)$ and an extreme maximum corner $(x_0+x_1, y_0+y_1, z_0+z_1)$ is calculated as:

$$f_{upper} = f(x_0,y_0,z_0) + f_x^+(x_0,y_0,z_0)x_1 +$$
$$f_y^+(x_0,y_0,z_0)y_1 + f_z^+(x_0,y_0,z_0)z_1 + 1/2 \ [f_{xx}^+(x_0,y_0,z_0)x_1^2 +$$
$$f_{yy}^+(x_0,y_0,z_0)y_1^2 + f_{zz}^+(x_0,y_0,z_0)z_1^2] + f_{xy}^+(x_0,y_0,z_0)x_1y_1 +$$
$$f_{xz}^+(x_0,y_0,z_0)x_1z_1 + f_{yz}^+(x_0,y_0,z_0)y_1z_1 + R.$$

in which the upper bound is greater than or equal to the absolute maximum value of the function in the volume element.

The lower bound of the function $f(x,y,z)$ in the volume element is calculated as:

$$f_{lower} = f(x_0,y_0,z_0) + f_x^-(x_0,y_0,z_0)x_1 +$$
$$f_y^-(x_0,y_0,z_0)y_1 + f_z^-(x_0,y_0,z_0)z_1 + 1/2 \ [f_{xx}^-(x_0,y_0,z_0)x_1^2 +$$
$$f_{yy}^-(x_0,y_0,z_0)y_1^2 + f_{zz}^-(x_0,y_0,z_0)z_1^2] + f_{xy}^-(x_0,y_0,z_0)x_1y_1 +$$
$$f_{xz}^-(x_0,y_0,z_0)x_1z_1 + f_{yz}^-(x_0,y_0,z_0)y_1z_1 + R,$$

in which the lower bound is less than or equal to the absolute minimum value of the function in the volume element. Other than the above-described classification method employed by update and classify circuit 90, the operation of image data processor 12 with the second preferred embodiment is similar to its operation with the first preferred embodiment.

The classification methods of the first and second preferred embodiments differ conceptually in that they provide, respectively, exact and approximate identification of the bounds of a function representing a halfspace. The identification of the extrema of a function in accordance with the first preferred embodiment exactly identifies the bounds of the function. The absolute upper and lower bounds of a function calculated in accordance with the second preferred embodiment provide one upper bound and one lower bound by which a halfspace can be approximately classified.

The second preferred embodiment sometimes erroneously classifies as PARTIAL a halfspace that is actually FULL or EMPTY for a particular volume element. Such errors result from the approximation of the extreme upper and lower bounds of the function. Since a PARTIAL classification only results in further subdivision of a volume element, such errors do not cause an incorrect rendering of the image. Classification errors generated by this embodiment only increase the number of subdivisions and classifications that are required to render an image. In spite of such erroneous classifications, the second preferred embodiment typically renders an image approximately 10 times faster than does the first preferred embodiment.

To classify a halfspace defined by a quadratic function $f(x,y,z)$, the classification method of the second preferred embodiment requires the storage of only ten values, i.e.. the value of the function $f(x,y,z)$, the three first derivatives of the function $f(x,y,z)$, and the six second derivatives of the function $f(x,y,z)$. After the initial determination of these values for the level 0 volume element, the values for subsequent volume elements can be determined by a fixed-point calculation scheme that updates the function values for different parts of the object space by incrementally changing the pertinent ones of the variables x, y, and z. Since volume elements are subdivided to the voxel level by means of bisection, each of the dimensions of a volume element is of a length that differs from the length of the side of a voxel by an integral power of two. The terms dx, dy, and dz are, therefore, always integral powers of two. As a result, multiplication by ones of the terms dx, dy, and dz is replaced by shifts of the binary decimal point.

Moreover, the order in which volume elements are classified causes the value of only one of the x, y, and z variables to be changed at a time for a subsequent volume element. As a result, updating the values of the function f(x,y,z) and its three first derivatives for a subsequent volume element requires the addition of only five shifted values per halfspace. The determination of the value of $f_{upper}$ or $f_{lower}$ requires only another nine additions of shifted values. The classification method employed in the second preferred embodiment employs about one-sixth the amount of data storage capacity as does the classification method employed in the first preferred embodiment.

Another important advantage of the classification method employed in the second preferred embodiment occurs in the rendering of halfspaces defined by higher-order functions. In the classification method employed in the first preferred embodiment, the classification of halfspaces having boundaries defined by polynomial functions of order greater than two requires the solution of systems of simultaneous nonlinear equations. In contradistinction, the classification method employed in the second preferred embodiment merely requires the calculation of a longer Taylor series, which is typically easier and faster than solving simultaneous nonlinear equations.

Figure 8:
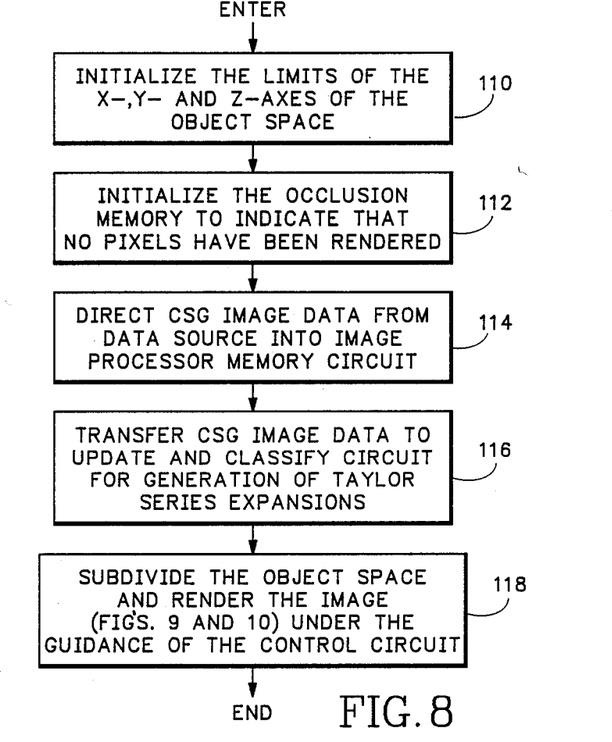
FIG. 8 is a flow diagram showing the main processing steps of the method of this invention.

FIG. 8 is a flow diagram showing the overall process involved in rendering an image from CSG image data. The flow diagram is described with reference to the classification method of the second preferred embodiment. The processes of the present invention can be programmed into and performed by any computer or microprocessor. The process can be embodied either as (1) code on a single computer or microprocessor, (2) cooperating code executing on several parallel processors each of which covers a different part of the object space, or (3) as special-purpose hardware such as that shown in FIG. 6.

With reference to FIG. 8, process block 110 indicates that the limits of the x-axis 30, the y-axis 32, and the z-axis 34 are initialized in accordance with the size of object space 28 and the resolution of display system 10.

Process block 112 indicates that occlusion memory 86 is initialized to indicate that no pixels have been rendered.

Process block 114 indicates that the CSG image data are directed from computer 18 through data transfer memory 72 and into image processor memory 80.

Process block 116 indicates that the CSG image data are transferred from memory 80, by way of data bus 76, to update and classify circuit 90, which calculates for an extreme minimum corner of the object space 88 the Taylor series values for each function defining a halfspace.

Process block 116 indicates that the object space is subdivided and the image is rendered under the guidance of control circuit 82. Control circuit 82 operates in accordance with the subdivision process of the present invention, which is described in greater detail with reference to FIGS. 9 and 10.

Figure 9:
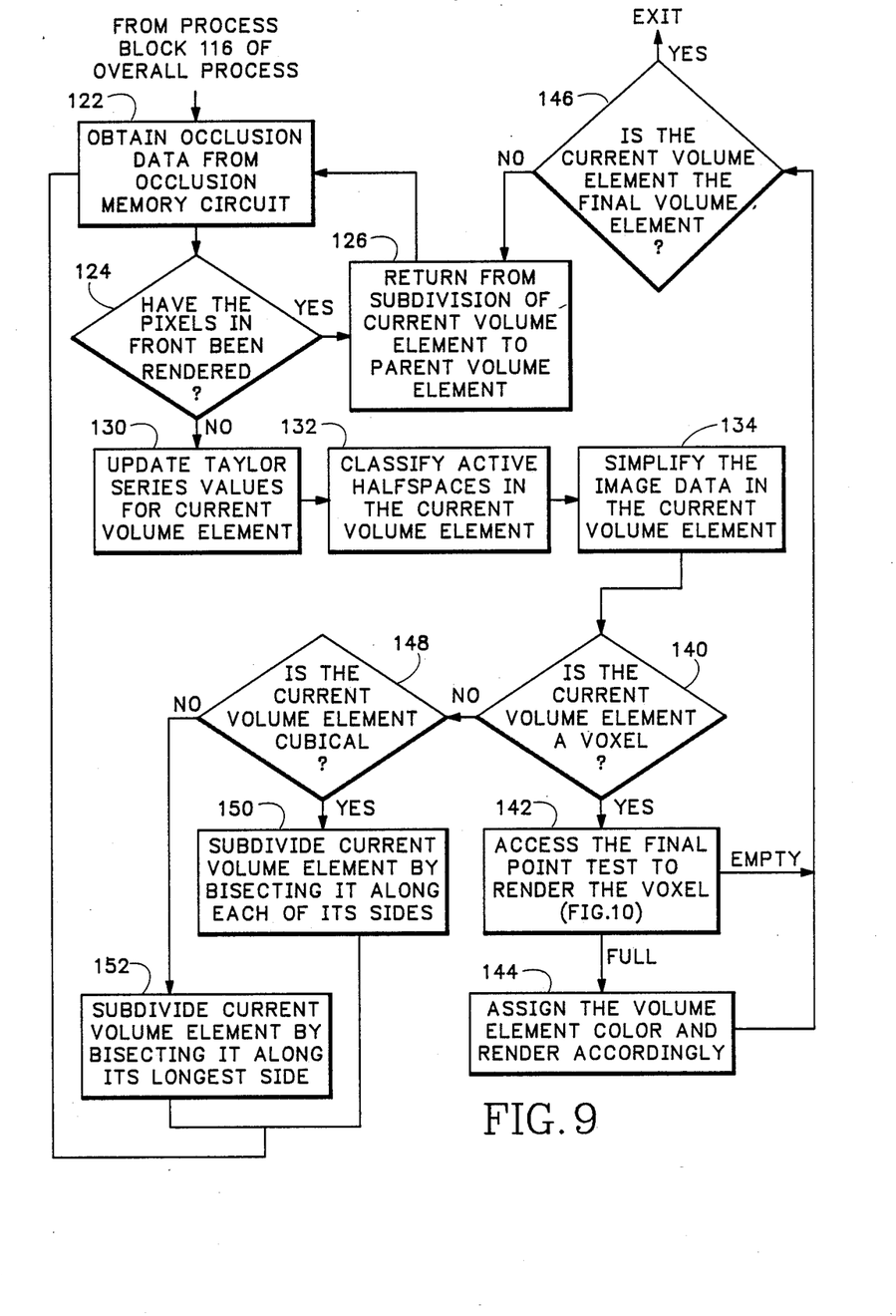
FIG. 9 is a flow diagram showing in detail the steps carried out in the subdivision process employed in accordance with this invention.

FIG. 9 is a flow diagram of the subdivision process used in the present invention. The subdivision process is accessed in process block 118 of the overall process.

With reference to FIG. 9, process block 122 indicates that the occlusion data for the pixels that are positioned in front of the current volume element are obtained from the occlusion memory 86.

Decision block 124 represents an inquiry as to whether the occlusion data indicate that the pixels that are positioned in front of the current volume element have been rendered. If the occlusion data indicate that all of the pixels have been rendered, decision block 124 proceeds on to process block 126. If the occlusion data indicate otherwise, decision block 124 proceeds to process block 130.

Process block 126 indicates that controller 82 directs the return from the subdivision of the current volume element to the volume element of the immediate lower level within which the current volume element is located (hereafter called the parent volume element), including the restoration of the CSG image data to its state in the parent volume element. If the formerly current volume element had been the last one to be classified at its level, the parent volume element is completely evaluated and controller 82 directs the return to the volume element from which the parent volume element was derived. Otherwise, controller 82 directs the classification of the volume element next in sequence at the same level as the formerly current volume element. Process block 126 directs the process back to process block 122.

Process block 130 indicates that the Taylor series values for each halfspace active in the current volume are updated in accordance with its extreme minimum corner. Each of the Taylor series values is updated by adding the appropriate shift of the Taylor series values from the values for the preceding volume element.

Process block 132 indicates that each active halfspace in the current volume element is classified by means of the classification method of the second preferred embodiment, thereby classifying each of the halfspaces in the current volume element as FULL, EMPTY, or PARTIAL.

Process block 134 indicates that data simplification circuit 100 simplifies the CSG image data for the current volume element by marking those halfspaces that are rendered inactive by the simplification identities. Controller 82 communicates with data simplification circuit 100 and stores in image processor memory 80 information regarding which ones of the halfspaces are active for each volume element level. Such information is employed, for example, when the CSG image data for a parent volume element are restored as indicated in process block 126.

Decision block 140 represents an inquiry as to whether the current volume element is the size of a voxel. If the current volume element is the size of a voxel, the process proceeds to process block 142 and the final point test method, which is described in greater detail below with reference to FIG. 10. If the current volume element is larger than a voxel, the process proceeds to decision block 148.

Process block step 142 indicates that a final point test process is employed for the extreme minimum point of the current volume element and its associated simplified image data. Step 142 initiates the final point test process to render volume elements that are the size of voxels.

Process block 144 indicates that the volume element is assigned a color. Whenever a volume element is assigned a color, a shading intensity for the volume element is calculated. The shading intensity is calculated using a known relationship that employs the normal to the halfspace as determined by the first derivatives of the function at the extreme minimum corner and a vector pointing to a lighting source.

Decision block 146 represents an inquiry as to whether the current volume element is the final volume element to be employed in rendering the image. If the current volume element is not the final volume element to be employed in rendering the image, the process returns to process block 126. If the current volume element is the final volume to be employed in rendering the image, the subdivision process is exited.

Decision block 148 represents an inquiry as to whether the current volume element is of cubical shape (i.e., the length along each of its sides is the same). If the current volume element is of cubical shape, the process proceeds to process block 150. If the current volume element is not of cubical shape, the process proceeds to process block 152.

Process block 150 indicates that the current volume element is subdivided by subdivider circuit 84 which bisects the volume element along each of its sides, thereby forming eight cubical higher level volume elements. Controller 82 (FIG. 6) directs the process back to process block 122 in turn for each of the eight higher level volume elements, employing for each of the volume elements the simplified CSG image data corresponding to the parent volume element. The one of the higher level volume elements being evaluated at a particular time is designated the current volume element.

Process block 152 indicates that the current volume element is divided in half across the axis along which the volume element is longest and then directs the process back to block 122. In the case of object space 28, process block 152 is reached at the subdivision of the level 0 volume element. Thereafter, the resulting volume elements are cubical and the process employs process block 150.

Figure 10:
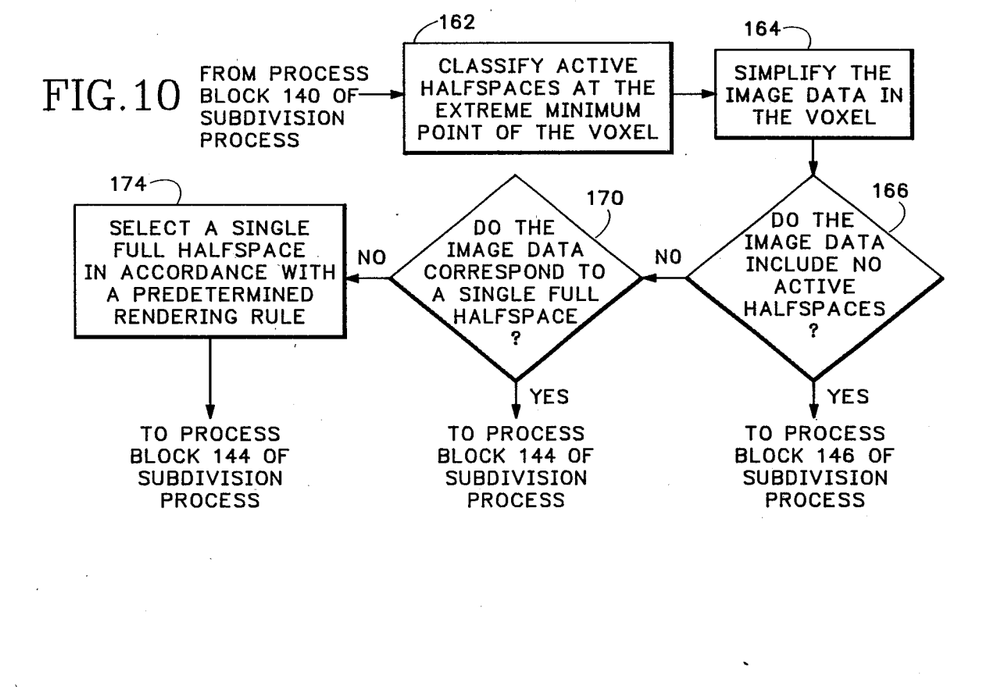
FIG. 10 is a flow diagram showing the steps carried out in the final point test process employed in this invention.

FIG. 10 is a flow diagram of the final point test process. With reference to FIG. 10, step 162 indicates that update and classify circuit 90 classifies each active halfspace at the extreme minimum point of the voxel. This classification of f is performed only at the minimum point $(x_0, y_0, z_0)$ of the voxel and is, therefore, FULL if $f(x_0, y_0, z_0) \leq 0$ or EMPTY if $f(x_0, y_0, z_0) > 0$. The final point test process is accessed in process block 146 of the subdivision process.

Process block 164 indicates that data simplification circuit 100 simplifies the remaining CSG image data for the voxel and marks those halfspaces that are eliminated as being inactive.

Decision block 166 represents an inquiry as to whether the simplified CSG image data for the voxel include no active halfspaces. If the image data include no active halfspaces, the process returns to process block 126 (FIG. 9) of the subdivision process. Otherwise, the process proceeds on to decision block 170.

Decision block 70 represents an inquiry as to whether the CSG image data comprise only a single halfspace classified as FULL. If the CSG image data comprise only a single halfspace classified as FULL, the process returns to process block 142 of the subdivision process. Otherwise, the process proceeds on to process block 174.

Process block 174 indicates that a predetermined rendering rule is employed to select a single halfspace from the simplified CSG image data for displaying the halfspace on screen 14. For example, the left-most halfspace in the alphanumeric string representing the active CSG image data could be selected, or a ray could be cast through the pixel to determine which halfspace is visible on display screen 14. Once such a selection is made, process block 174 returns to process block 142 of the subdivision process. Under an alternative rendering rule, the voxel is rendered in accordance with the ray casting method.

In an alternative embodiment of the processes described with reference to FIGS. 8-10, decision 140 represents an inquiry as to whether the current volume element has fewer than, for example, twelve, active halfspaces. If the current volume element has fewer than twelve active halfspaces, the final point test process employs the ray casting method to render the volume element and then returns to decision block 146. If the current volume element has twelve or more active halfspaces, the process proceeds to decision block 148.

It will be obvious to those having ordinary skill in the art that many changes may be made to the details of the above-described preferred embodiments of the present invention without departing from the underlying principles thereof. For example, the present invention can be employed in a stereoscopic graphics display system. The scope of the present invention should be determined, therefore, only by the following claims.

I claim:

1. In a graphics display system that forms on a display screen a two-dimensional image representing a three-dimensional object, the two-dimensional image being defined by image data comprising mathematical functions that represent plural halfspaces having boundaries that divide an object space into interior object space regions lying inside the halfspaces and exterior object space regions lying outside the halfspaces, at least one of the halfspaces having a nonplanar boundary, a method of rendering the image, comprising:

subdividing the object space into volume elements;

identifying for each volume element an upper bound and a lower bound for values of the mathematical functions representing the boundaries of the halfspaces;

determining which ones of the upper and lower bounds of the mathematical functions lie inside their corresponding halfspaces;

simplifying the image data in accordance with simplification identities to reduce the number of halfspaces, the simplification taking place whenever both the upper and lower bounds correspond to locations lying inside the halfspace; and rendering the image on the display screen in accordance with the simplified image data.

2. The method of claim 1 in which each volume element comprises a boundary and a volume element interior and in which the identification of the upper and lower bounds of the functions representing boundaries of the halfspaces comprises identifying extrema of the mathematical functions for each volume element, the extrema lying on the boundary and the volume element interior being separately identified.

3. The method of claim 2 in which each volume element comprises a boundary and a volume element interior, the boundary being of rectangular parallelepiped shape and including plural faces, edges, and vertices, and the extrema lying on the volume element interior and on the faces, edges, and vertices of the boundary of the volume element being separately identified.

4. The method of claim 2 in which the extrema of the mathematical functions are identified by calculating first partial derivatives of the mathematical functions for each volume element.

5. The method of claim 1 in which the image data are arranged in a constructive solid geometry format.

6. The method of claim 1 in which the upper bound is an approximation that is greater than or equal to the maximum value of the mathematical function in the volume element and the lower bound is an approximation that is less than or equal to the minimum value of the mathematical function in the volume element.

7. The method of claim 1 in which the identification of the upper and lower bounds of the mathematical functions representing boundaries of the halfspaces comprises calculating Taylor series expansions of the mathematical functions.

8. The method of claim 7 in which the Taylor series expansion can include positive and negative terms, the method further comprising approximating the Taylor series expansions of the mathematical functions so that only positive terms are included in the identification of the upper bound and only negative terms are included in the identification of the lower bound.

9. The method of claim 7 in which each volume element comprises an extreme minimum corner and an extreme maximum corner, the Taylor series for each mathematical function being expanded about the extreme minimum corner of the volume element.

10. A graphics display system, comprising:
a display screen on which a two-dimensional image representing a three-dimensional object is formed, the two-dimensional image being formed in accordance with image data that include plural halfspaces having boundaries which are represented by mathematical functions and which divide an object space into interior regions that are inside the halfspaces and exterior regions that are outside the halfspaces, at least one of the halfspaces having a nonplanar boundary; and
image data processing means communicating with the display screen for generating from the image data a control signal that controls the formation of the two-dimensional image on the display screen; the control signal being generated by subdividing the object space into volume elements, identifying with respect to each volume element an upper bound and a lower bound for the values of the mathematical functions representing the boundaries of the halfspaces, determining which ones of the upper and lower bounds of the mathematical functions lie inside their corresponding halfspaces, and simplifying the image data in accordance with simplification identities to reduce the number of halfspaces, the simplification taking place whenever both the upper and lower bounds correspond to locations lying inside the halfspace.

11. The system of claim 10 in which each volume element comprises a boundary and a volume element interior and in which the identification of the upper and lower bounds of the functions representing boundaries of the halfspaces comprises identifying extrema of the mathematical functions for each volume element, the extrema lying on the boundary and the volume element interior being separately identified.

12. The system of claim 11 in which each volume element comprises a boundary and a volume element interior, the boundary being of a rectangular parallelepiped shape and including plural faces, edges, and vertices, the extrema lying on the interior of the volume element and on the faces, edges, and vertices of the boundary of the volume element being separately identified.

13. The system of claim 11 in which the extrema of the mathematical functions are identified by calculating first partial derivatives of the mathematical functions for each volume element.

14. The system of claim 10 in which the identification of the upper and lower bounds of the mathematical functions representing boundaries of the halfspaces includes calculating Taylor series expansions of the mathematical functions.

15. The system of claim 14 in which the Taylor series expansion can include positive and negative terms, the image processing means approximating the Taylor series expansions of the mathematical functions so that only positive terms are included in the identification of the upper bound and only negative terms are included in the identification of the lower bound.

16. The system of claim 14 in which each volume element comprises an extreme minimum corner and an extreme maximum corner, the Taylor series for each mathematical function being expanded about the extreme minimum corner of the volume element.

* * * * *